INVENTORS
R.V. HALVORSEN
W.F. KRAUSE
R.J. POLIVKA
BY
ATTORNEY

INVENTORS
R. V. HALVORSEN
W. F. KRAUSE
R. J. POLIVKA
BY E. H. Kane
ATTORNEY

Patented Oct. 13, 1953

2,655,059

UNITED STATES PATENT OFFICE 2,655,059

TOOL OPERATING MACHINE HAVING APPARATUS FOR POSITIONING WORK IN A PLURALITY OF POSITIONS

Russell V. Halvorsen, Antioch, William F. Krause, Chicago, and Rudolph J. Polivka, Berwyn, Ill., assignors to Western Electric Company, Incorporated, New York, N. Y., a corporation of New York Application February 16, 1951, Serial No. 211,218

14 Claims. (Cl. 77—64)

This invention relates to a tool operating machine having apparatus for positioning work in a plurality of positions and more particularly to a hydraulic and electric actuating and control mechanism in a tool operating machine for intermittently advancing the work into a plurality of operative positions and for moving the work into engagement with the tool at each of the operative positions.

It is an object of the present invention to provide a mechanism for moving a work piece to and from a plurality of positions in a tool operating machine and to effect relative movement of the tool and the work.

A feature of the invention relates to the provision of a hydraulically actuated work supporting fixture for reciprocating the work in one direction and for reciprocating the work in another direction at right angles to said one direction to permit the movement of the work sequentially to a plurality of operative or drilling positions and a loading position.

Another feature of the invention relates to the provision of adjustable stop means for limiting the movement of the work holding fixture in opposite directions to accurately locate the fixture in the drilling positions and to vary the location of said drilling positions, together with control mechanism including pressure switches actuated by an increase in the hydraulic pressure in the actuators in response to the arrival of the work holding fixture at each of its several drilling positions for controlling the movement of the work into engagement with the drills and for controlling the movement of the fixture from one position to another.

A still further feature of the invention relates to the hydraulically actuated work holder for clamping the work in position.

Another feature of the invention is the provision of a drill guide plate yieldably mounted for movement with the work.

In accordance with one embodiment of the invention as applied to a drilling machine having a vertically reciprocable work table for engaging the work with the drill, there is provided a fixture for moving the work horizontally on the table and through a predetermined path into a plurality of drilling positions which comprises a first plate supported on the table for movement in a forward and backward direction and actuated by a hydraulic actuator, and a second plate mounted on the first plate for movement in a sidewise direction and actuated between adjustable stops by a second hydraulic actuator.

The work is clamped in hydraulically actuated work holders mounted on the top plate and is movable by actuation of the first and second plates from a loading position rearwardly to a first drilling position in response to the movement of the lower plate by its hydraulic actuator into engagement with a stop. The upper plate is then moved to the left by its actuator to advance the work to the second drilling position after which the lower plate is moved forwardly toward the loading position and into engagement with vertically movable stops raised into the path of travel of the lower plate to position the work in the third drilling position. The upper movable plate is then moved to the right against a stop to position the work in its fourth drilling position after which the work is moved a short distance rearwardly to enable the movable stops to be retracted after which the lower plate and the work is moved to its original or loading position, thus completing its cycle. A control mechanism including pressure switches individually connected to opposite ends of the actuators associated with the lower and upper plates and actuated in response to a predetermined pressure encountered when the fixture is stopped at successive stations, serves to advance the work holding fixture and the work thereon successively from one to another of the drilling stations and serves to actuate a control element for effecting the vertical reciprocation of the table and the work thereon at each of the work drilling stations after each indexing movement of the fixture. A selector switch is settable to permit the work to be moved into any combination of one or more of the four drilling positions of the machine.

Other objects and advantages of the invention will become apparent by reference to the following detailed description thereof and the accompanying drawings illustrating a preferred embodiment of the invention, in which.

The machine illustrated herein embodying the present invention is disclosed as being set up for drilling a plurality of groups of holes in a work piece W (Fig. 12) shown as comprising an angle iron frame member in which each group comprises four drilled holes, 25—1, 25—2, 25—3 and 25—4 arranged as shown in the drawings.

Figure 1:
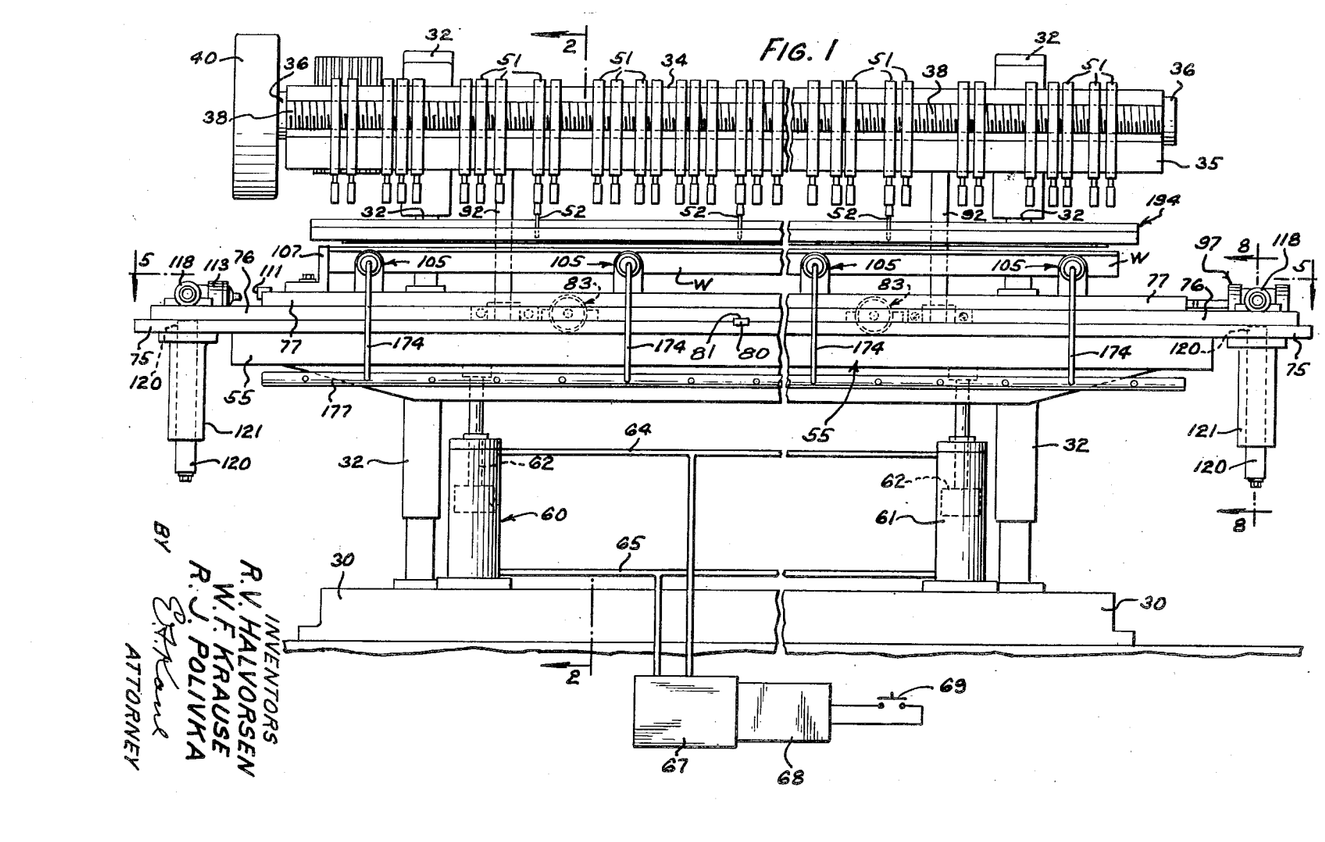
Fig. 1 is a front elevational view of a multiple spindle drilling machine showing the invention applied thereto.
Figures 2, 3:
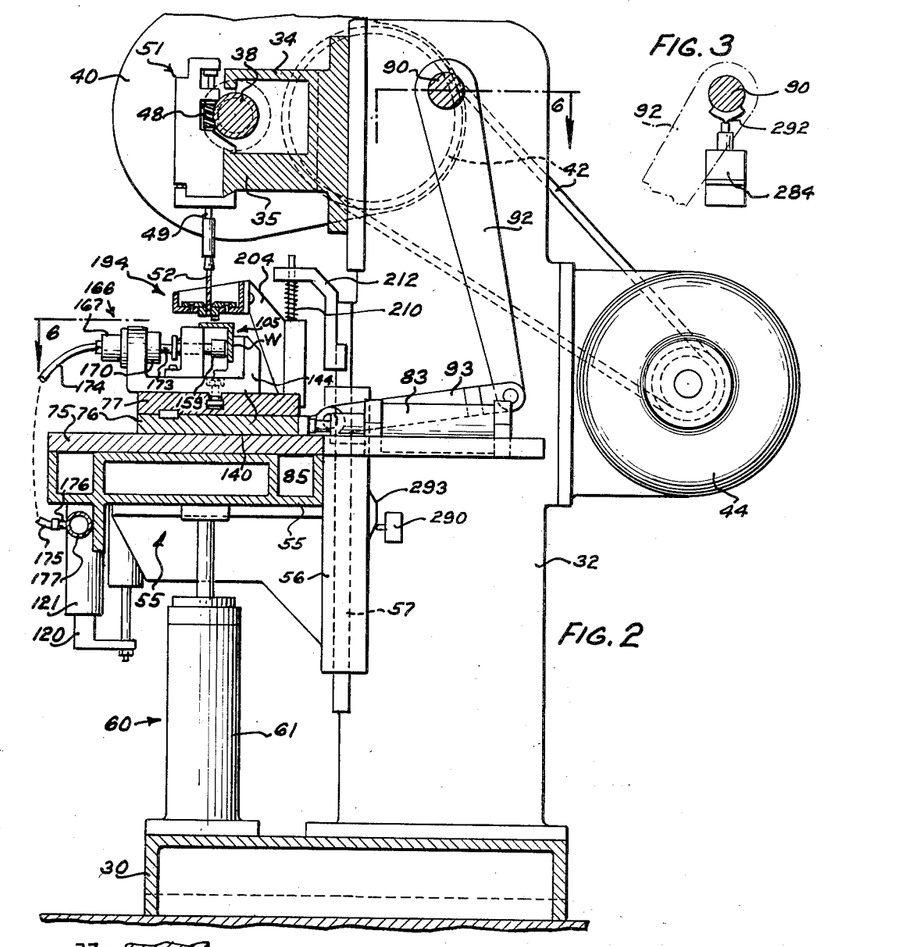
Fig. 2 is a vertical sectional view of the machine taken on line 2—2 of Fig. 1 showing the vertically reciprocable table on its lower position and the fixture and work thereon in one of the drilling positions.
Fig. 3 is a detail view showing a limit switch actuatable when the fixture is in its forward position for rendering the table actuating mechanism inoperable.

The machine comprises a base 30 (Figs. 1 and 2) on which are mounted a plurality of vertical standards or frame members 32—32 to the upper end of which is secured a horizontal frame member 34. The horizontal frame member 34 is substantially channel shaped forming a horizontally extending rail 35 and has bearing members 36—36 at each end thereof for supporting a drive shaft 38. The shaft 38 is driven through gearing enclosed in a gear box 40 and a belt and pulley transmission 42 from a motor 44 mounted on the rear of the vertical frame members 32 (Fig. 2). The shaft 38 has spiral gear teeth formed on the periphery thereof and constitutes and elongated spiral gear which meshes with spiral gears 48 on spindle shafts 49 rotatably mounted in spindle units 51. The spindle units 51 are clamped to the rail 35 and are adjustable longitudinally thereon to position the spindles 49 and the drills 52 carried thereby in predetermined positions. The drills 52 are thus mounted against axial movement and are continuously rotated through their connection with the spiral gear drive shaft 38 and the drive motor 44.

A work table 55, provided for supporting the work and moving it into and out of engagement with the drills 52, has channel shaped slide members 56 slidably engageable with vertical guide members 57 formed on the frame members 32 for guiding the table 55 for vertical movement. A pair of hydraulic actuators 60, are provided each comprising a cylinder 61 supported on the base 30 and a piston 62 and piston rod connected to the table 55. Hydraulic fluid such as oil directed into opposite ends of the cylinders 61 through lines 64 and 65 and supplied thereto from a conventional hydraulic system including a pump and control valves indicated diagrammatically by the rectangle 67 and under control of an electrical control mechanism indicated by the rectangle 68 and having a control element or switch 69 to initiate the cycle of operation serves to raise and lower the table 55 and the work supported thereby through one cycle of movement.

Actuating and control mechanism is provided for supporting the work in position on the table 55 and for moving the work from a loading station or position to successive operative or drilling stations or positions and back to the loading position, and to stop the work at each drilling position and cause the actuation of the control element 69 to effect the movement of the work into engagement with the drills.

Figure 5:
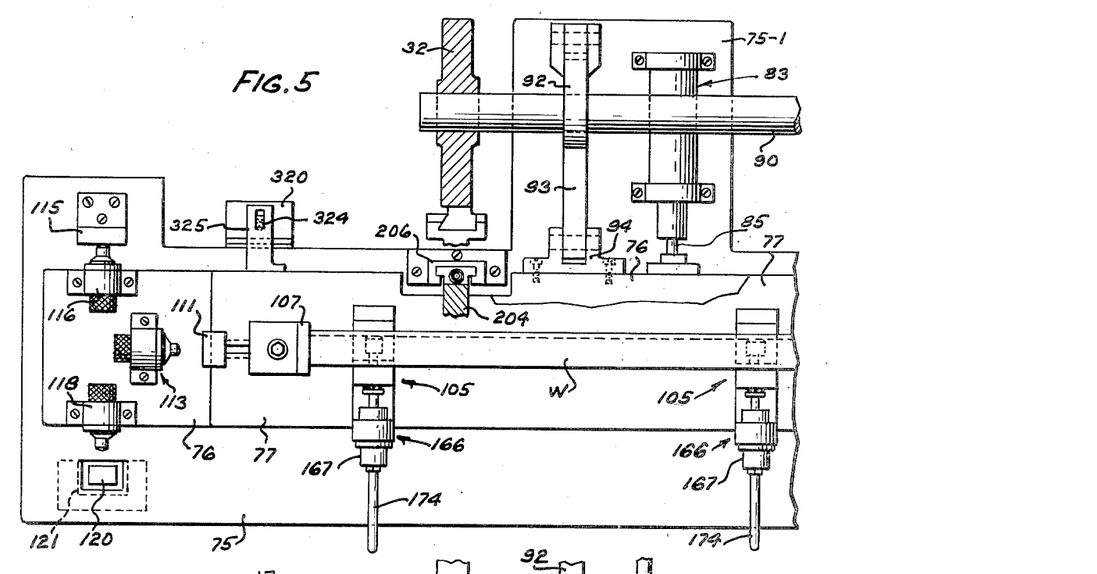
Figs. 5 and 5-A are enlarged fragmentary plan sectional views of the machine taken on the line 5—5 of Fig. 1 showing the work and the work supporting fixture in its No. 1 drilling position.
Figure 5A:
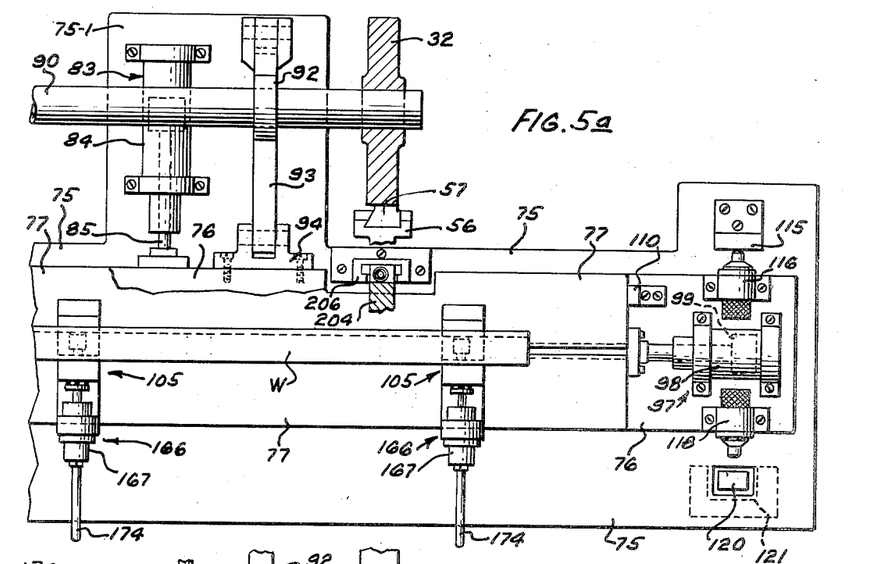

The mechanism for supporting and moving the work W is in the form of a fixture which comprises a supporting plate 75 (Figs. 1, 2, 5, 5-A, 6 and 6-A) fixed to the upper portion of the table 55 and projecting beyond the table at each end thereof and having portions 75—1 projecting rearwardly beyond the table. Mounted on the plate 75 is a movable plate or member 76 on which is mounted a movable upper plate 77. A key 80 on the stationary plate 75 fitting in key way 81 guides the plate 76 for movement in a forward and rearward direction. A pair of hydraulic motors or actuators 83 comprising cylinders 84 mounted on the rearwardly extending portions 75—1 of the supporting plate 75 and pistons 85 having rods connected to the movable plate 76 are provided for moving the plate 76 and the work supported thereon in a forward and rearward direction.

To insure that both ends of the relatively long movable plates 76 move simultaneously and to the same extent an equalizing device is provided comprising a rock shaft 90 journaled for oscillation in the upper portions of the frame members 32 and having a pair of arms 92 secured thereto. Pivotally secured to the lower ends of the arms 92 are the ends of links 93, the other ends of which are pivotally connected to lugs 94 on the lower movable plate 76. Thus movement imparted to one end of plate 76 will be transmitted to the other end of the plate 76 to effect simultaneous and equal movement of both ends of the plate.

The upper plate 77 is guided for movement from side to side on the lower plate 76 in a direction perpendicular to the forward and rearward direction of movement of the lower plate 76. A key and keyway connection between the movable plates 76 and 77 prevents transverse displacement of the plates relative to each other. A hydraulic motor or actuator 97 is provided for reciprocating the plate 77 and comprises a cylinder 98 secured to the lower plate 76 and having a piston 99 and a piston rod connected to the plate 77.

Work holders 105 in the form of hydraulically actuated clamps are mounted on the upper plate 77 for holding the work in a predetermined position thereon. One end of the work W is adapted to engage a stop or gauge 107 (Figs. 1, 5 and 6) adjustably mounted on the plate 77 to locate the work W longitudinally in the proper position on the fixture.

Figure 14:
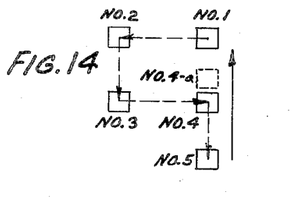
Fig. 14 is a diagrammatic view indicating a path of travel of the work and work supporting fixture and indicating various positions thereof.

It will thus be seen that with this arrangement of the upper and lower slide plates for supporting the work W, the plates 76 and 77 may be actuated in timed relation to each other to move the work through a predetermined path and advance the work into a plurality of predetermined drilling positions. As indicated diagrammatically in Fig. 14 the work W supported on the work holding fixture, may be moved from a loading or No. 5 position rearwardly to position No. 1 where the hole 25—1 may be drilled after which the work may be moved to the left drilling position No. 2 where hole 25—2 may be drilled after which a work may be moved forwardly to position No. 3 where the hole 25—3 may be drilled, after which the work may be moved to the right to the drilling position No. 4 to permit the drilling of hole 25—4, after which the work may be moved forwardly to the loading position No. 5.

Stop means are provided for limiting the movement of the plate 27 in opposite directions and for limiting the movement of the lower plate 76 to accurately position the work supporting fixture and the work W relative to the drills to insure the drilling of the holes 25 in predetermined positions in the work. A stop 110, Fig. 5–A, fixed to the plate 76 is engageable with the end of the plate 77 to limit its movement in a right hand direction and a block 111 (Figs. 5 and 6) secured to the plate 77 at the left hand thereof as engageable with an adjustable stop 113 secured to the movable plate 76. A pair of fixed stops 115 secured to the supporting plate 75 are adapted to engage adjustable stops 116 mounted on opposite ends of the plate 76 to limit the rearward movement thereof. Adjustable stops 118 mounted on the forward edge of the plate 76 at opposite endes thereof are adapted to engage retractible stops 120 (Figs. 5, 5–A, 6, 6–A, 8 and 9) when the stops 120 have been raised into the path of forward movement of the plate 76 to stop the work in an operative or drilling position intermediate the No. 1 drilling position and the No. 5 or loading position. The retractible stops 120 are guided for vertical movement in guide members 121 secured to the lower side of the plate 75 and are connected at their lower ends to the lower ends of piston rods 122 of pistons 123 movable within cylinders 124 which in turn are also secured to the plate 75.

Figure 11:
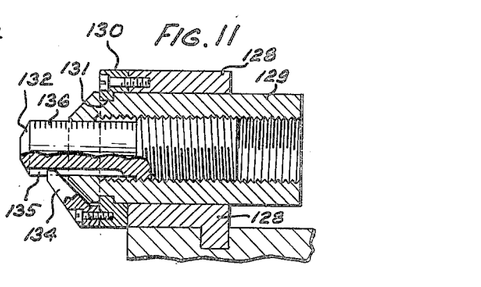
Fig. 11 is a vertical longitudinal sectional view through an adjustable stop for positioning the work supporting fixture.

The adjustable stops 113, 116 and 118 are of the micrometer type. As shown in Fig. 11 each stop comprises a block 128 having a cylindrical bore for rotatably supporting a barrel 129, and a split collar 130 fixed to the block and having an inwardly extending flange 131 engaging in a groove in the barrel and serving to lock the barrel against axial movement. At its forward end the barrel 129 has a cylindrical bore for rotatably receiving the cylindrical portion of an adjustable anvil or stop member 132, the threaded rear portion of which engages the internally threaded portion of the barrel. A stationary key 134 fixed to the block 128 engages in a key way 135 in the anvil member and serves to prevent rotation thereof so that as the barrel is rotated the anvil is caused to move axially. Calibrations 136 on the anvil and on the conical forward surface of the barrel serve to indicate the position of the stop surface on the forward end of the anvil.

Figure 15:
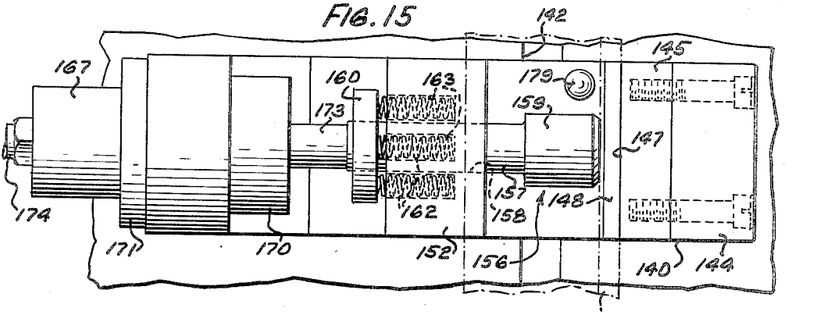
Fig. 15 is a plan view of one of the hydraulically actuated work holders.
Figure 16:
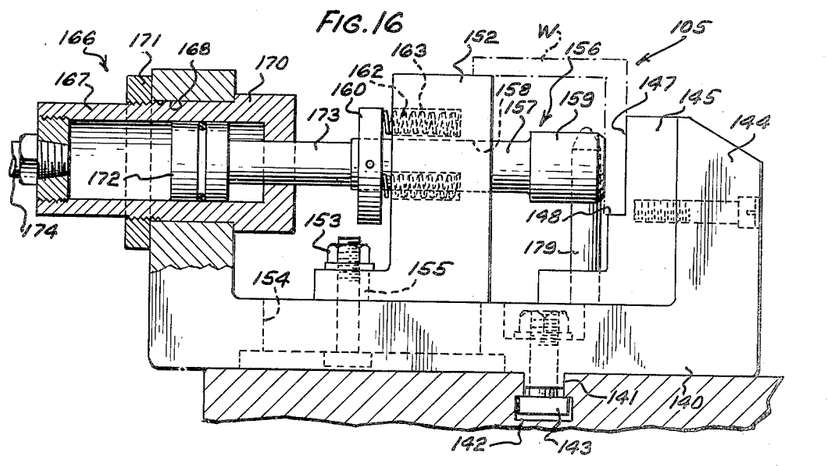
Fig. 16 is a side elevational view of the work holder shown in Fig. 15.

The hydraulically actuated work holders 105 (Figs. 15, 16 and 17) each comprises a U-shaped base member 140 having a key 141 adapted to engage in a T slot 142 in the upper movable plate 77 and has a bolt 143 engageable in the T slot for securing the work holder to the plate. At one end thereof the base member 140 has an upwardly extending portion 144 to which a removable jaw member 145 is secured by a bolt 146. The member 145 forms a stationary jaw and has a vertical surface 147 for receiving one face of one leg of the angle iron work W and a horizontal surface 148 forming a shoulder for receiving the edge of the leg of the work W thereon. A portion of the other leg of the angle iron work piece W rests on the upper edge of a block 152 which is adjustably supported on the base member 140 and is secured thereto by a bolt 153 passing through a slot 154 in the base 140 and through a slot 155 in a laterally extending portion of the block 152. A movable jaw 156, the shank 157 of which is mounted in a bore 158 in the block 152, has a head 159 adapted to engage one leg of the work piece W and clamp it against the surface 147 of the stationary jaw 145. A collar 160 pinned to the opposite end of the shank 157 is engaged by a plurality of helical springs 162 disposed in recesses 163 in the block 152, the springs serving to move the movable jaw 156 to the left as viewed in Fig. 16.

The movable jaw 156 is moved toward the stationary jaw by a hydraulic actuator 166, which comprises a cylinder 167 fitting in a bore 168 in an upwardly extending portion 169 of the frame member 140 and secured therein between a shoulder 170 formed on the cylinder and a lock nut 171 threaded on the cylinder. The cylinder 167 is coaxially aligned with the shank 156 and a piston 172 slidable therein has a rod 173 engageable with the end of the shank 157 for imparting movement thereto. The piston is actuated in one direction to move the jaw 156 to its closed position to clamp the work W by a hydraulic medium introduced into the cylinder through a flexible line 174 (Fig. 2), one end 175 of which is detachably connected to one of a plurality of self closing fittings 176 on a manifold 177. Upon release of the hydraulic pressure in the cylinder 167, the springs 162 move the movable jaw to its open position and also move the piston 172 rearwardly in the cylinder a corresponding distance.

Any suitable stop means may be provided to limit the rearward movement of the jaw 156 and the piston 172. In the embodiment illustrated in Fig. 16, the rearward movement of the jaw 156 is stopped by the engagement of the head 159 with the block 152. The movement of the movable jaw to and from its closed and open positions is less than the length of the full travel of piston 172 and may be merely sufficient to permit clearance for the application and removal of the work piece W to and from the work holder. With the reduction of the travel of the movable jaw to and from open and closed positions to a minimum, the work clamping and unclamping operation is accordingly expedited and requires a minimum of time to accomplish. The block 152 may be moved toward or away from the stationary jaw 145 and clamped in various positions to accommodate work pieces W of various sides. A guide member or post 179 extends upwardly from the frame member 140 in spaced relation to the surface 147 of the stationary jaw and aids in guiding the work W into position between the clamping jaws 147 and 157.

Figure 17:
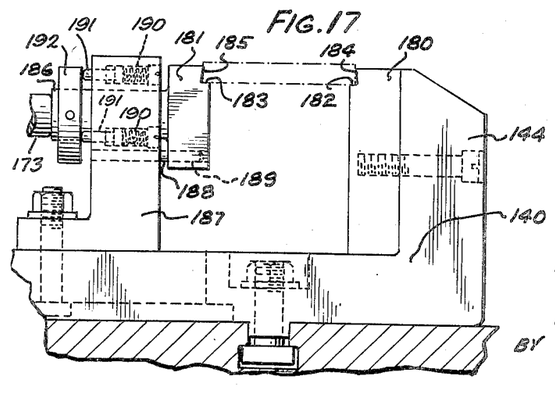
Fig. 17 is a fragmentary view of a modified embodiment of work holder.

The members 145 forming the stationary jaw, and the block 152 and the movable jaw supported thereby may be removed from the body member 140 and replaced with similar parts having different shaped work receiving recesses therein for supporting and clamping work pieces of different shapes. As shown in Fig. 17 a stationary jaw member 180 and movable jaw member 181 are each provided with a recess formed in the upper portion thereof to provide horizontal surface 182, 183 and upwardly extending surfaces 184, 185 for receiving and supporting a rectangular work piece W therein. A movable jaw 181 which is similar to the movable jaw 159 has a shank 186 mounted in a bore in a supporting block 187 and is moved into clamping position by the piston rod 173 of the hydraulic actuator 166. A pin 188 mounted in the block 187 and slidable in aperture 189 in the jaw 181 and serves to prevent rotation of the jaw 181 and springs 190 cooperating with pins 191 and a collar 192 fixed to the shank 186 serves to move the jaw 181 to its open position upon release of the fluid pressure in the hydraulic actuator.

Figures 6, 7:
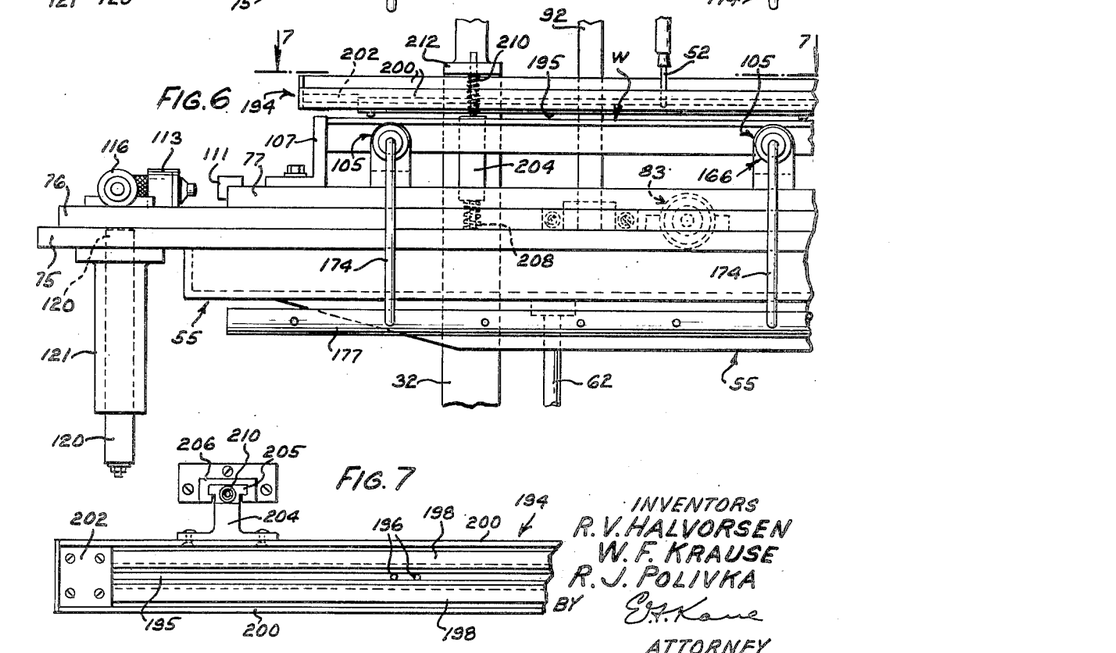
Figs. 6 and 6-A are front elevational views of that portion of the apparatus shown in Figs. 5 and 5-A.
Figs. 7 and 7-A are fragmentary plan sectional views taken on the lines 7—7 of Figs. 6 and 6-A showing the drill guide.
Figures 6A, 7A:
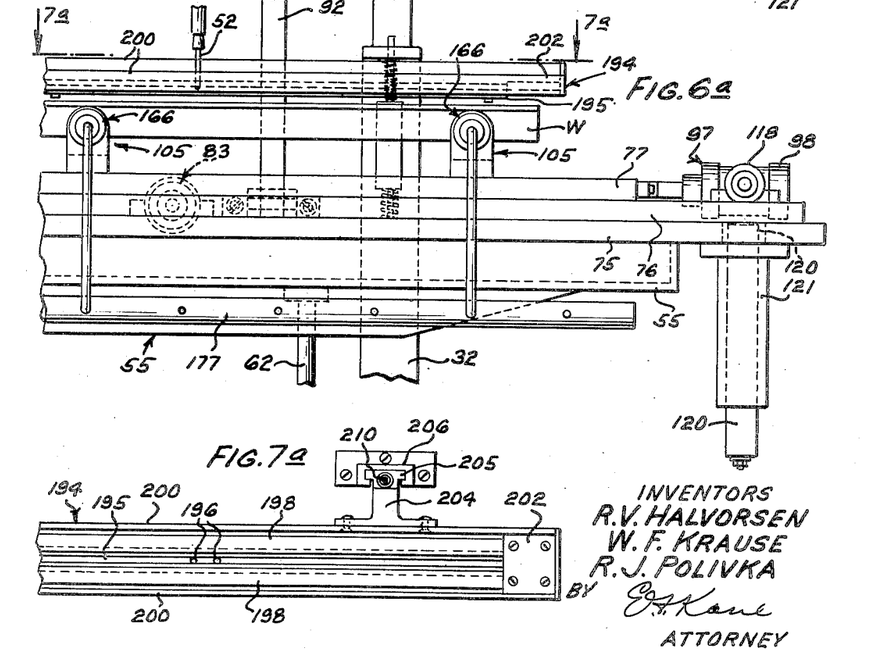
Figure 8:
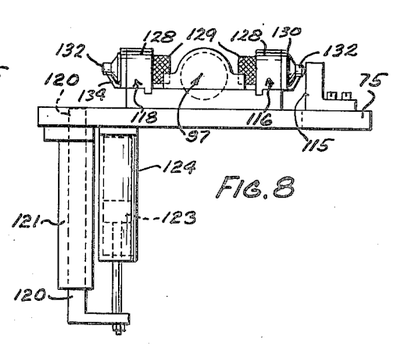
Fig. 8 is a vertical sectional elevation view of a portion of the apparatus taken on the line 8—8 of Fig. 1 showing a vertically movable stop for limiting the forward movement of the fixture in its lower or retracted position.
Figure 9:
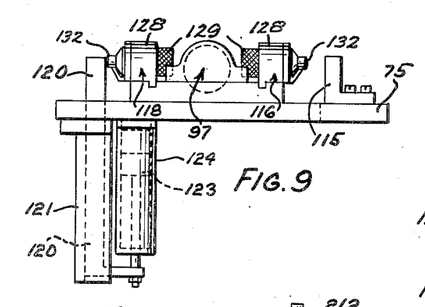
Fig. 9 is a view similar to Fig. 8 showing the movable stop in its raised position.
Figure 10:
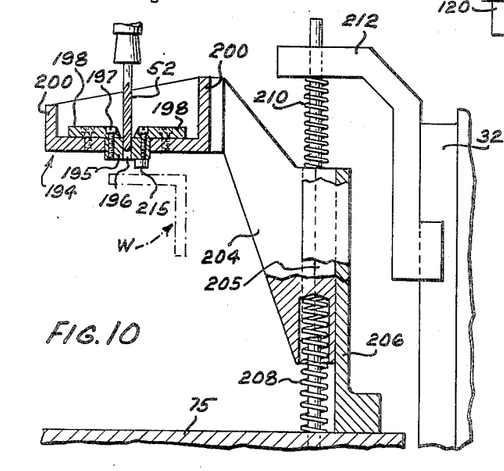
Fig. 10 is a vertical sectional view of a portion of the apparatus showing the drill guide.

A drill guide 194 (Figs. 2, 6, 6–A, 7, 7–A and 10) is provided to accurately locate the ends of the drills 52 and comprises a plate 195 having apertures 196 therein for receiving and guiding the drills 52. The drill guide plate 195 is removably secured by screws 197 to plates 198 which are mounted in spaced relation to each other on a pair of angle frame members 200 connected at their ends by members 202 (Figs. 7 and 7–A). Fixed to one of the angle members 200 of the drill guide 194 is a plurality of brackets 204 formed with vertically extending T shaped slide portion 205 slidably mounted for vertical movement in T shaped slots in guide members 206 mounted on the supporting plate 75. The drill guide 194 is yieldably supported for vertical movement at an elevation slightly above the work W to permit free movement of the work to and from drilling positions under the drill guide. Springs 208 mounted in recesses in the lower portion of the brackets 204 and engaging the plate 75 serve to yieldably support the frame 194 and the drill guide plate 195 in its normal lower position shown in Fig. 2. Springs 210 interposed between the upper portion of the brackets 204 and brackets 212 fixed to the vertical frame members 32 serve to yieldably maintain the frame 194 and drill guide plate 195 in their normal position. The springs 210 are stronger than the springs 206. As the table 55 is raised to move the work W upwardly into engagement with the drills 52, the work W engages spacer members 215 on the plate 195 and moves the drill guide 194 upwardly and compresses the springs 210. On completion of the drilling operation and as the work W recedes, the springs 210 act to return the guide 194 to its normal position. The spacer members 215 projecting from the lower side of the plate 195 serve to space the work W from the plate 195 during the drilling operation to provide clearance for the passage of drill chips between the work W and the plate 195.

Figure 18:
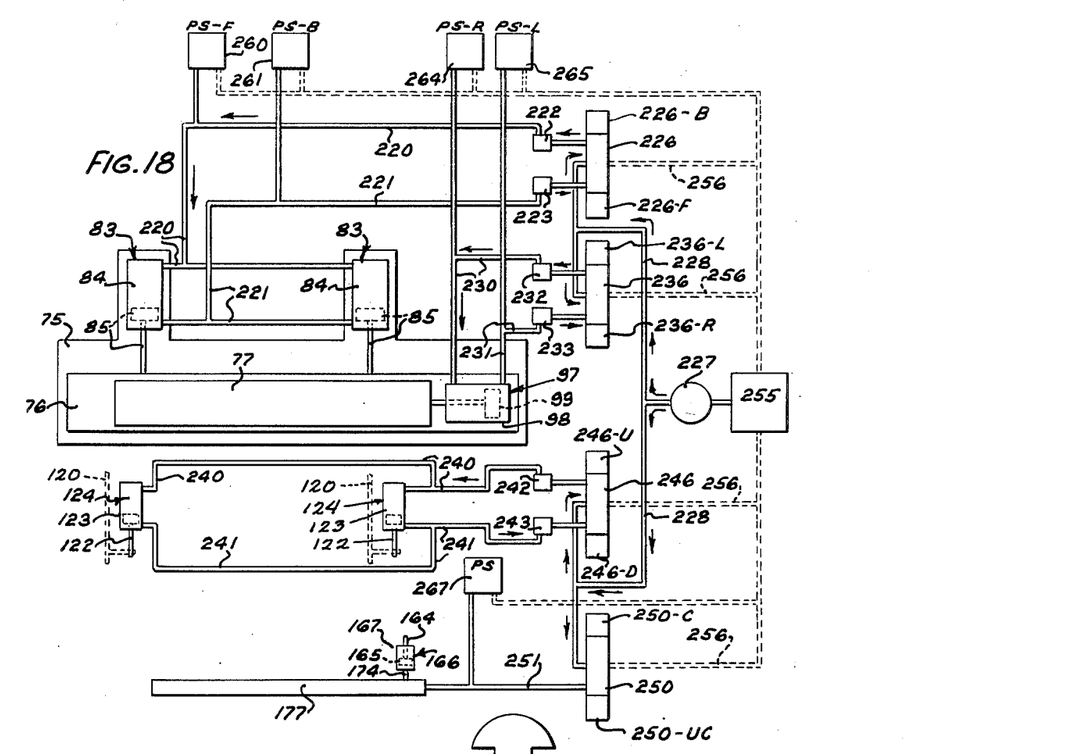
Fig. 18 is a diagrammatic view of the hydraulic actuating mechanism.
Figure 19:
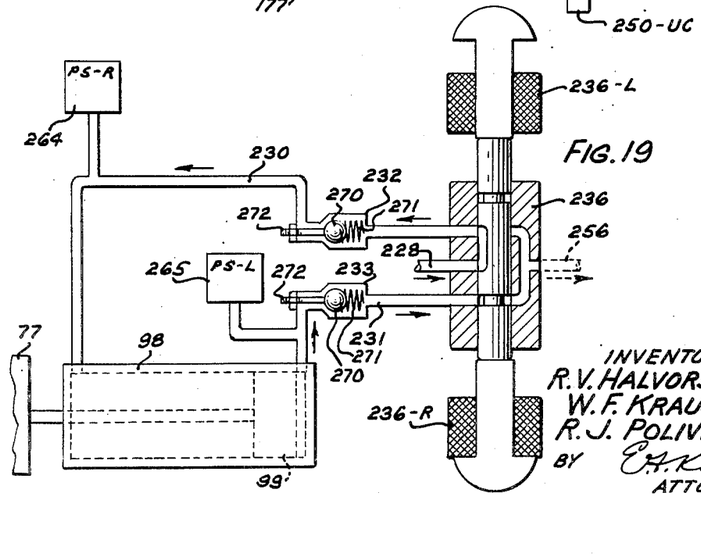
Fig. 19 is an enlarged diagrammatic view of a portion of the hydraulic actuating mechanism shown in Fig. 18.

The hydraulic system associated with the actuators 83, 97, 124 and 167 is shown diagrammatically in Figs. 18 and 19. Lines 220 and 221 connected to opposite ends of cylinders 84—84 are connected through flow regulating check valves 222 and 223 to a solenoid operated control valve 226. Oil from a pump 227 is supplied through a line 228 at a predetermined relatively high pressure to the valve 226. Lines 230 and 231 connected to opposite ends of the cylinder 98 are connected through flow control valves 232 and 233 to a solenoid actuated control valve 236 which is supplied with oil through the line 228. In like manner the cylinder 124 associated with the retractile stops 120 have connected to opposite ends thereof lines 240 and 241 which are connected through flow control valves 242 and 243 to a solenoid actuated valve 246 which is also connected to the line 228. A solenoid actuated control valve 250 connected to the supply line 228 has connected to one port thereof a line 251 which connects to the manifold 177 for supplying hydraulic pressure to the actuators 166.

The control valves 226, 236, 246 and 250 are similar to each other and are of the type having a piston movable to and from two positions and actuated from one position to another by a pair of solenoids disposed at opposite ends of the piston. In response to momentary energization of one of the solenoids, the valve piston is moved by the solenoid from one position to the other position to reverse the flow of the hydraulic fluid in the lines connected thereto and the valve remains in this position until the other solenoid is energized to actuate the valve to said one position to again reverse the flow of the hydraulic fluid in the lines leading therefrom.

The valve 236 as shown in simplified form in Fig. 19 has a solenoid 236–L and a solenoid 236–R for actuating the valve piston into alternate positions in response to the alternate energization of the solenoids. In the position illustrated in Fig. 19 the solenoid 236–R has been last energized and has actuated the valve to a predetermined position to direct flow of hydraulic fluid through the lines 230 into the left hand end of cylinder 98 to move the piston 99 therein and the plate 77 and work W thereon to the right, the hydraulic fluid at the right hand of the cylinder passing through the line 231 into the valve 236 and returning to an oil reservoir 255 through a line 256 indicated in dotted lines. In like manner the valve 226 has solenoids 226–F and 226–B associated therewith for alternately reversing the valve to cause the reversal of the flow of hydraulic fluid in the lines 220 and 221 to effect the reciprocation of the piston 85, the plate 76 and the work W in a forward and backward direction. Thus in response to the momentary energization of the solenoid 226–B, the work supporting fixture and the work W thereon are caused to move toward the back, in response to the momentary energization of the solenoid 226–F the fixture and work are caused to move toward the front, in response to the energization of the solenoid 236–L the fixture and work are caused to be moved toward the left, and in response to the energization of the solenoid 236–R the fixture and work are caused to be moved toward the right.

The control valve 246 has solenoids 246–D and 246–U associated therewith and is arranged so that when the solenoid 246–D is momentarily energized the valve 246 is moved to a position to cause pistons 123 and the retractible stops 120 connected thereto to be moved down and upon energization of the solenoid 246–U the valve 246 is actuated to a position to cause the pistons 123 and the stops 120 to be moved up. Solenoids 250–C and 250–UC are associated with the control valve 250 and in response to the momentary energization of the solenoid 250–C, the valve is positioned to direct the oil through the line 251 into the manifold 177 to actuate the actuators 166 and effect the clamping of the work W in the work holders 105. In response to momentary energization of the solenoid 250–UC, the valve is actuated to the other position to release the fluid pressure in the manifold 177 and the actuators 166 to unclamp or release the work W.

Pressure switches 260 and 261 are connected in the lines 220 and 221 respectively and communicate with the rear and front ends of the cylinders 84. Another pair of pressure switches PS—R and PS—L are connected in the lines 230 and 231, respectively, and communicate with the left hand and right hand ends of the cylinder 98. It will be noted that the pressure switches are connected into their respective lines between the flow regulating valves and the cylinders. Each of the pressure switches is actuated to open position when the pressure applied to the switch falls below the predetermined relative high value of the hydraulic pressure of the line 228, and the switch is actuated to closed position when the pressure applied to the switch rises to said predetermined relatively high value of the hydraulic pressure in line 228.

A normally open pressure switch 267 is connected in the line 251 and is actuated to its closed position when the line 251 is connected to line 228 and is subjected to the relatively high hydraulic pressure therein.

The flow control valves 222, 223, 232 and 233 are of the ball type as shown in Fig. 19 in which each valve has a ball 270 urged toward its closed position by a spring 271 and engaged by a stem 272 which is adjustable for controlling the size of the orifice through which the oil passes on its way from the control valve to the cylinder. By adjusting the stems 272 in the flow control valves the velocity of the pistons and the work supporting fixture may be varied. Thus the control valves 222, 223, 232 and 233 control the rate of flow of oil to the cylinders 84 and 98 and thereby control the velocity of the piston while permitting free flow of oil from the cylinders. The flow control valves also serve to create the pressure differential in the lines on opposite sides of the flow control valves when oil is flowing through the lines and into the cylinders associated therewith. The oil pressure in the line up to the flow control valve builds up to that of the pump immediately after the line is connected to the pump or line 228, but the oil is restricted in its flow through the flow control valve and into the cylinder. The oil pressure is therefore slower in building up in the cylinder and only increases to a relatively low value sufficient to move the piston until the piston and the fixture are stopped, at which time the oil pressure in the cylinder reaches the relatively high value of the pump pressure. Thus when the lines 220, 221, 230 and 231 are connected to the pump, the flow control valves are effective in achieving a relatively low oil pressure in the cylinders and in preventing the pressure in the cylinders from reaching the relatively high value of the pump pressure until the movement of the piston has been stopped and the fixture has arrived at a selected drilling position.

The oil pressure in the lines 220, 221, 230 and 231 drops to zero when the lines are not connected to the pump through the solenoid actuated control valves and line 228, and the normally open pressure switches associated with the lines remain in their open positions. After the lines have been connected to the pump the normally open pressure switch in each of the lines remains open while the oil in the line is flowing into the cylinder associated therewith and the pressure switch is actuated to its closed position only after the piston has stopped and the oil pressure has increased to the relatively high value of the pump pressure.

It will be seen from Figs. 18 and 19 that when the control valve 236 has been actuated to cause the piston 99 to move to the right and its movement is stopped, the pressure switch PS—R will be actuated to closed position and the pressure switch PS—L will be open, and when the piston 99 has been caused to move to the left and its movement is stopped, the pressure switch PS—L will be actuated to closed position and pressure switch PS—R will be open. Similarly when the pistons 85 have been caused to move rearwardly and their movement is stopped, the pressure switch PS—B is actuated to closed position and the pressure switch PS—F is open, and when the pistons 85 have been caused to move forwardly and their movement has been stopped by the retractible stops 120 or when the pistons 85 have reached the limit of their forward movement to move the fixture and the work W in No. 5 position, the pressure switch PS—F is actuated to closed position and the pressure switch PS—B is open. Thus in any of the five positions of the fixture, the drilling positions Nos. 1, 2, 3 and 4 and the loading position No. 5, two of the four pressure switches will be actuated to their closed positions and the other two actuated to their open positions.

The pressure switches PS—F, PS—B, PS—L and PS—R (Fig. 20) are individually connected in series with control relays 275, 276, 277 and 278, respectively, across powerlines 280 and 281 connected to a suitable source of power. The control relay 275 has normally open contacts F–1 to F–4, the control relay 276 has normally open contacts B–1 to B–4, the control relay 277 has normally open contacts L–1 to L–4, and the relay 278 has normally open contacts R–1 to R–4. The contacts R–3, B–3, L–3, B–4, L–4, F–3, R–4 and F–4 are connected in series parallel and are connected on one side through a limit switch 284 and a relay 285 to the powerline 280, and on the other side through a pair of normally open contacts 286—1 of a timer 286 to a line 288 which in turn is connected through a limit switch 290 to the powerline 281.

Thus when the contacts R–3 and B–3 are closed in response to the movement of the fixture to the rear and right or the No. 1 position, or when the contacts L–3 and B–4 are closed in response to the movement of the fixture to the rear and left or the No. 2 position, or when the contacts L–4 and F–3 are closed in response to the movement of the fixture to the left and forward or the No. 3 position, or when the contacts R–4 and F–4 are closed in response to movement of the fixture to the right and forward or the No. 4 position, a path is completed through this portion of the circuit so that when the contacts or switches 284, 286 and 290 are also closed, the relay 285 will be energized to close the control switch 69 to initiate a vertical reciprocation of table 55 and the work W thereon and cause the holes 25 to be drilled in the work.

The normally closed limit switch 284 is actuated to an open position by a cam 292 (Fig. 3) mounted on the shaft 90 when the work holding fixture is moved to its No. 5 position, and thus prevents the vertical reciprocation of the table when the fixture is in its normal loading position. The normal open limit switch 290 (Fig. 2) is actuated to closed position by a cam 293 on the table 55 at the end of the downward movement of the table.

Figure 20:
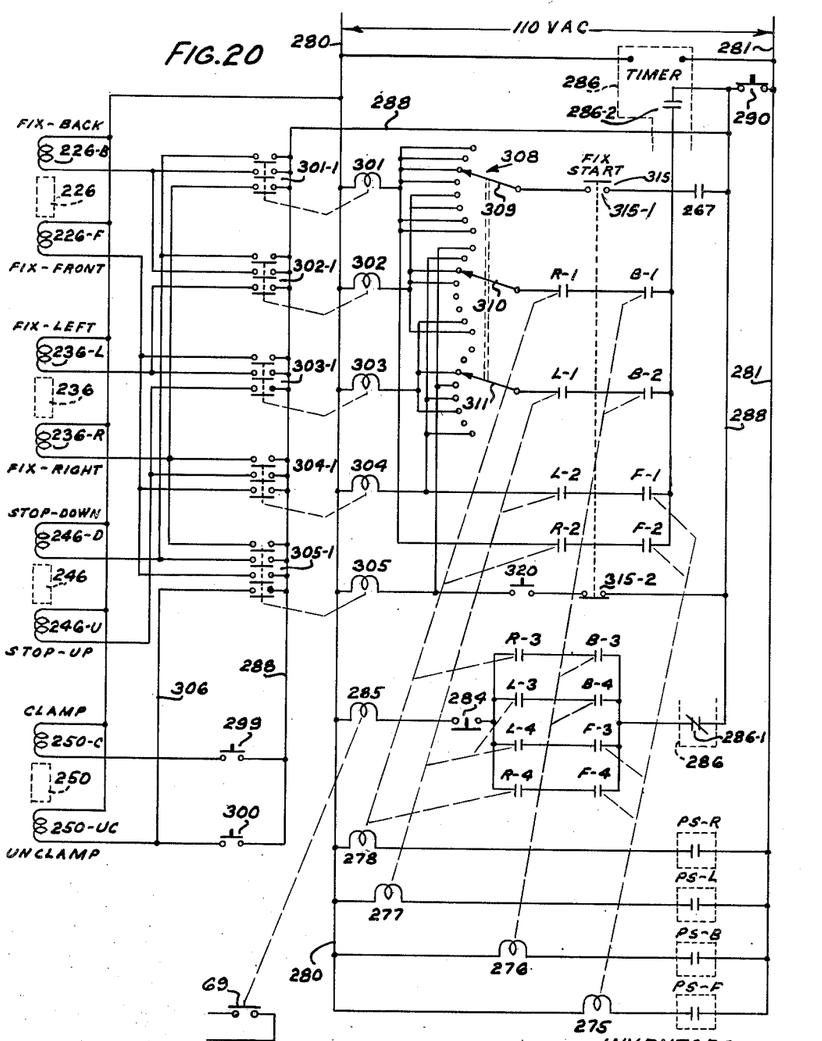
Fig. 20 is a schematic of the electrical control system in the condition existing when the apparatus is in its normal inoperative position with the work holding fixture in its loading station and the table down.

The timer 286, parts of which are indicated in dotted lines in separated relation in Fig. 20, is connected across the powerline 280 and 281 and has the aforementioned contacts 286—1 and also has another pair of contacts 286—2 connected between the line 288 and the contacts B—1, B—2, F—1 and F—2.

The timer 286 is shown in Fig. 20 in a condition where it has timed out and has closed contacts 286—1 and opened the contacts 286—2. This is the condition that obtains when the apparatus is in its normal inoperative or neutral position with the table 55 down and the limit switch 290 closed, and with the work holding fixture in its loading or No. 5 position and the limit switch 284 open. As the table 55 is raised the switch 290 is opened and causes the timer 286 to be reset to its normal position with the contacts 286—2 in their normally closed position and the contacts 286—1 in their normally open position. As the table reaches its lowermost position on the return stroke it again closes switch 290 to start the timer which, after a predetermined length of time, as for example .2 of a second, will time out and open contacts 286—2 and close the contacts 286—1, the contacts 286—2 and 286—1 remaining in their open and closed positions, respectively, until the timer is again reset in response to the opening of the switch 290 during the upward movement of the table.

The solenoids 226—B and 226—F associated with the valve 226, the solenoids 236—L and 236—R associated with the control valve 236, and the solenoid 246—D and 246—U associated with the valve 246, are individually connected to the powerline 280 and through groups 301—1, 302—1, 303—1, 304—1 and 305—1 of contacts to line 288. The solenoids 250—C and 250—UC associated with the control valve 250 for clamping and unclamping the work holders 105 are connected in series with normally open push button switches 299 and 300, respectively, across the lines 280 and 288. The solenoid 250—UC is also connected by lead 306 to one of the contacts of group 305—1. As indicated by dotted lines in Fig. 20 each of the groups 301—1, 302—1, 303—1, 304—1 and 305—1 of contacts is associated with and actuated by one of five relays 301, 302, 303, 304 and 305 which are connected to power line 280 and to a selector switch 308 having three levels of contacts and three movable contact arms 309, 310 and 311, associated respectively with the three levels of contacts. The movable contact arm 309 of the selector switch 308 is connected in series with the normally open contacts 315—1 of a fixture start push button switch 315 and the pressure switch 267 to the line 288, the movable arm 310 is connected in series with normally open contacts R—1 and B—1, and the movable arm 311 is connected in series with normally open contacts B—1 and L—2. The relay 304 is connected in series with the contacts L—2 and F—1, the contacts R—2 and F—2 are connected in series with the relay 301, and the relay 305 is connected in series with the normally closed contacts 315—2 of the fixture start switch 315 and a normally open limit switch 320.

Figure 4:
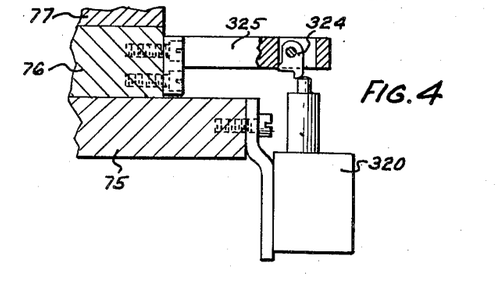
Fig. 4 is a fragmentary view of a portion of the work supporting fixture showing a limit switch thereon actuatable at a predetermined point in the rearward movement of the fixture.

The limit switch 320, Fig. 4, is mounted on the plate 75 and is actuated to a closed position at a predetermined point in the rearward movement of the fixture by a pawl or dog 324 pivotally mounted on the arm 325 fixed to the lower movable plate 76 for movement therewith. The pawl 324 is operative to actuate the switch 320 to its closed position at a predetermined point during the rearward movement of the plate 76 and is rocked about its pivot and rendered inoperative during the forward movement of the plate 76 and the fixture.

The normally open pressure switch 267 is actuated to its closed position in response to the application of hydraulic pressure to line 251 and the closing of the hydraulic actuators 167 to clamp the work W.

*Operation*

Figure 12:
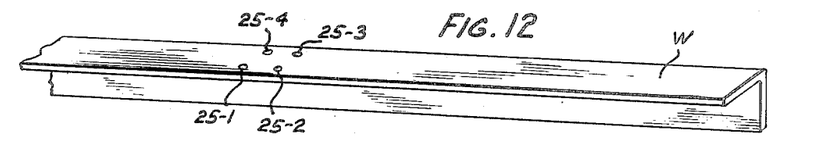
Fig. 12 is a perspective view of an angle iron work piece showing the arrangement of holes drilled therein at the four drilling positions.

To drill a plurality of groups of holes in a work member as for example an angle bar W in each group of which there are four holes 25—1 through 25—4 drilled in sequence and arranged as shown in Fig. 12, we shall assume that the machine is set up with the drills properly arranged on the machine and that the table 55 is in its lower position, and that the work holding fixture is in its normal forward, or No. 5 position. With the table 55 in its lower position the limit switch 290, Fig. 20, is actuated to its closed position, and with the fixture in its No. 5 position, the actuators 83 and 97, Fig. 18, urge the fixture forwardly and to the right and the switch 284 is open. The operator may now apply the angle bar W to the work holders 105 with one leg of the angle bar positioned between the movable and stationary jaws 159 and 145 and in engagement with the shoulder 148, and then move the angle bar to the left as viewed in Figs. 1 and 7 to position the end thereof against the stop 107 on the fixture. The operator may then press the push button switch 299 to energize the solenoid 250—C and actuate the control valve 250 to a position to effect the actuation of the hydraulic actuators 166 to clamp the work W in position. In response to the application of fluid pressure to the actuators 166 the pressure switch 267 (Figs. 18 and 20) is actuated to closed position as stated before.

With the fixture in its normal or No. 5 position the valves 226 and 236 are in positions directing the flow of oil into the actuators 84 and 97 in directions to urge the fixture in a forward direction and to the right and to actuate the pressure switches PS—F and PS—R to their closed positions. To move the fixture to the No. 1 drilling position the operator presses the fixture start push button switch 315 to close the contacts 315—1 and complete a circuit from the power line 281 through the limit switch 290 and the pressure switch 267, selector switch 308 and the relay 301 to the power line 280 to energize the relay 301 and cause the closing of the groups 301—1 contacts. With the closing of groups 301—1 contacts the solenoid 246—D is energized to effect the movement of the stop 120 downwardly, the solenoid 236—R is energized to actuate the valve 236 and effect the movement of the fixture to the right, and the solenoid 226-B is energized to actuate the valve 226 to direct the flow of oil into the actuators 84 to move the fixture rearwardly or to its back position. Since the stop 120 is already in its down position and the fixture is in its right hand position, the only action that occurs is the rearward movement of the fixture to its No. 1 position.

As the oil flows through the flow control valve 223 and into the cylinder 84 to move the fixture rearwardly a temporary pressure differential in the line 221 is created. The pressure switch PS—B has been previously actuated to its open position. After the fixture has arrived at station No. 1 the pressure in the line 221 is equalized and raised to the relatively high value to actuate the pressure switch PS—B to its closed position. With pressure applied to the line 230 tending to move the fixture to the right the pressure switch PS—R is closed and the pressure switch PS—L is open. Thus directly after the fixture arrives at the No. 1 drilling position pressure switches PS—R and PS—B are closed, the contacts R-1 to R-4 and B-1 to B-4 associated therewith are closed, and the circuit is completed from the power line 281 through the switch 290 contacts 286—1 of the timer 286, the contacts R-3 and B-3, the limit switch 284 and the relay 285 to the power line 280 to energize the relay 285. Upon energization of the relay 285 the control switch 69 is actuated thereby to cause the work table 55 and the fixture and work thereon to be vertically reciprocated through one cycle of operation to effect the drilling of a hole 25—1 in the angle iron W at station No. 1.

As the table 55 is raised the switch 290 is opened and causes the timer 286 to be reset to its normal position with the contacts 286—2 in their normally closed position and with the contacts 286—1 in their normally open position. After the holes 25—1 are drilled and the table reaches its lowermost position on the return stroke it again closes switch 290. With the closing of the switch 290 a circuit is completed from the power line 281, through switch 290, contacts 286—2, B-1 and R-1, the contact arm 310 and portions of the selector switch 308, and relay 302 to the power line 280 to cause the energization of the relay 302 the closing of the group 302—1 of contacts. The closing of the switch 290 also starts the timer which, after a short interval, times out and opens the contacts 286—2 and closes contacts 286—1. With the closing of the contacts 302—1 the solenoid 246-D is again energized to effect the retraction of the stop 120, if it is not already down, the solenoid 226-B is energized to effect the movement of the fixture rearwardly to its back position, if the fixture is not in this position, and the solenoid 236-L is energized to actuate the control valve 236 to effect the movement of the fixture to the left to its No. 2 drilling position. In response to the actuation of the valve 236 the oil pressure is transferred from line 230 to line 231. Pressure switches PS—R and PS—L are open until the fixture arrives at drilling position No. 2 and the stop 111 on plate 77 engages stop 113 on plate 76 at which time the relatively low pressure in the line 231 and in the cylinder 98 rises to the relatively high value and actuates pressure switch PS—L to its closed position. Thus, almost immediately after the arrival of the fixture to the No. 2 drilling position pressure switches PS—B and PS—L are closed and the contacts B-1 to B-4 and L-1 to L-4 associated therewith are likewise closed and a circuit is completed through switch 290, contacts 286—1 of the timer 286, contacts B-4 and L-3, switch 284 to the relay 285 to energize the relay and effect the actuation of the control switch 69 to again initiate another cycle of vertical movement of the table 55 and the work thereon and effect the drilling of holes 25—2 in the angle iron W at drilling station No. 2.

As the table reaches its lowermost position after the holes 25—2 have been drilled the switch 290 is closed and a circuit is completed from the power line 281 through the contacts 286—2, B-2, L-1, contact arm 311, selector switch 308, and the relay 303 and effect the closing of the groups 303—1 of contacts 1, to complete circuits and to energize the solenoid 246-U, 236-L, and 226-F. With the energization of solenoids 246-U, 236-L and 226-F the control valves 246, 236 and 226 are actuated to predetermined positions, if they are not already in said positions, to cause the stop 120 to be raised to its up position, to cause the fixture to be moved to the left, and to cause the fixture to be moved forwardly until the stop 118 on the plate 76 engages with the retractible stop 120 to arrest the fixture in its No. 3 drilling station.

With the fixture in its No. 3 drilling position pressure switches PS—L and PS—F and the contacts L-1 to L-4 and F-1 to F-4 are closed and complete a circuit through the switch 290, the contacts 286—2 of the timer 286, contacts F-3, L-4, switch 284, relay 285, to energize the relay 285 and actuate the control switch 69 to again cause the table 55 to move through one reciprocation to effect the drilling of holes 25—3 in the angle iron W at station No. 3.

As the table 55 reaches its lowermost position with the fixture at position No. 3 after the holes 25—3 have been drilled, the switch 290 is again closed and complete a circuit through the contacts F-1, L-2, relay 304 to energize the relay 304 and actuate the group 304—1 of contacts associated therewith to complete circuits to cause the energization of solenoid 226-F, 236-R and 246-U and cause the actuation of control valves 226, 236 and 246 to predetermined positions if they are not already in said positions. Thus, in response to the energization of the solenoid 236-R the control valve 236 is actuated to a position to effect the movement of the fixture to the right to its No. 4 drilling position with the plate 77 in engagement with the stop 110. With the fixture in its No. 4 drilling position pressure switches PS—R and PS—F and the contacts R-1 to R-4 and F-1 to F-4 are closed and a circuit is completed through switch 290, contacts 286—2, F-4, R-4 limit switch 284 to relay 285 to energize the relay and cause the actuation of the control switch 69 to initiate another cycle of vertical reciprocation of the table 55 and the drilling of holes 25—4 in the angle iron work piece W at position No. 4.

With the work holding fixture at drilling position No. 4, the stops 120 are in their up position and it is necessary to lower them before the fixture can be moved to its normal or No. 5 position. Inasmuch as the oil pressure in cylinder 84 maintains the pressure of the stop members 118 against the movable stops 120 it is necessary to move the fixture a short distance rearwardly toward the station No. 1 to disengage the stops 118 from stops 120 to relieve the pressure therebetween and to permit the retraction of the stops 120 to their down position. Thus the fixture after the drilling of the holes at the No. 4 drilling station is moved a slight distance rearwardly to a position indicated as No. 4A in Fig. 15 and is then moved forwardly to its No. 5 position.

When the table 55 reaches its lower position at station No. 4 after having drilled holes 25—4 the switch 290 is closed to complete a circuit through the contacts 286—2, F-2, R-2 and the relay 301 to cause the energization of the relay 301 to close the groups 301—1 of contacts and effect the movement of the stops 120 to their down position and the movement of the fixture toward its No. 1 position. At a predetermined point in the movement of the fixture toward the No. 1 position, indicated in Fig. 14 as the No. 4A position, the pawl 324, Fig. 4, carried by the movable plate 76 actuates the switch 320 to its closed position completing a circuit from the power line 281 through limit switch 290 the normally closed contacts 315—2 of the fixture start push button switch 315 and the relay 305 to the power line 280 to energize the relay 305 and actuate the group 305—1 of contacts to closed position. With the closing of the groups 305—1 of contacts the solenoids 226-F, 236-R, 246-D and 259-UC are energized to actuate the valves associated with said solenoids to selected positions to effect the forward movement of the fixture to its No. 5 position and to cause the work holder 105 to be actuated to release or unclamp the work W.

At a predetermined point, the No. 4A position, in each movement of the fixture from its loading position toward the No. 1 drilling position the limit switch 320 is actuated and if the contacts 315—2 of the fixture start push button switch 315 is closed the relay 305 is energized to cause the fixture to reverse its direction of movement at this point and return to the No. 5 position. It is necessary therefore that the operator depress the fixture push button start switch 315 and continue to hold it down with the contacts 315—2 thereof open, until the fixture has passed the point where the limit switch 320 is momentarily actuated to closed position in order to interrupt the circuit to the relay 305 at this point and insure that the fixture will move to the No. 1 drilling station.

When the fixture is moved to its No. 5 position the limit switch 284 is actuated to open position by the cam 292 (Fig. 3) on the rock shaft 90 thus preventing completion of the circuit to relay 285 and preventing the vertical reciprocation of the table 55 and the work thereon when the fixture is at the No. 5 station. It will be seen that upon arrival of the work holding fixture at any of the four drilling positions, Nos. 1, 2, 3 and 4, a circuit is completed to the relay 285 to energize the relay and actuate the control switch 69 to initiate a cycle of vertical reciprocation of table 55 and the work W thereon, and it is only when the fixture arrives at its loading or No. 5 position that the limit switch 284 is actuated to open position to interrupt the circuit to the relay 285 and prevent the vertical reciprocation of the table 55 and the work W thereon.

Figure 13:
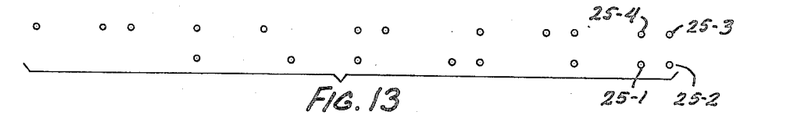
Fig. 13 is a diagrammatical view of a plurality of groups of holes indicating the various arrangements of holes which may be drilled in the work piece.

By setting the movable contact arms 309, 310 and 311 of the selector switch 308 to various positions on the switch a variation in the number and the arrangement of the holes drilled in the work piece W may be made. In addition to the four holes drilled as described above, the machine and the selector switch 308 may be set up to move the fixture and the work W into various positions to drill a single hole, a pair of holes, or a set of three holes, for each drill, arranged as indicated diagrammatically in Fig. 13.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an article working apparatus having a rotatable tool, an article supporting table for guiding said article to and from said tool, and actuating means for reciprocating said table, the combination therewith of a fixture for moving an article on said table into a plurality of predetermined positions comprising a first member on said table reciprocable through a predetermined stroke in one direction, a second member reciprocable on said first member through a predetermined stroke in another direction transverse to said one direction, means on said second member for holding said article, fluid actuators operable at a relatively low pressure for advancing and retracting said first and said second members, means for selectively directing fluid to said actuators at a predetermined relatively high pressure, means for creating a pressure differential in the fluid directed to said actuators while the fluid is flowing into said actuators to move said fixture into said plurality of predetermined positions at said relatively low pressure and to equalize said pressure in said fluid to said high pressure when said fluid has ceased flowing into said actuators, pressure switches connected to said fluid actuators and actuatable to and from closed and opened positions in response to variation in pressure between said relatively low pressure and said relatively high pressure, and control means including said pressure switches operable in response to actuation of a pair of said switches to initiate the actuation of said actuating means to reciprocate said table.

2. In an apparatus of the type described, the combination of a first member, means mounting said first member for reciprocable movement in one direction, a second member mounted on said first member for reciprocable movement in another direction transversely to said one direction, a first cylinder and piston operatively connected to said first member for reciprocating said first member, a second cylinder and piston operatively connected to said second member for reciprocating said second member, stop means for arresting the movement of said first and said second members in opposite directions to stop said members in operative positions, means for adjusting said stop means to change the location of the operative positions of said members, means for selectively supplying hydraulic fluid to opposite ends of said cylinders at a pressure of a relatively low value to effect the movement of said members and for increasing the pressure in the cylinders to a relatively high value in response to the stopping of the movement of said first and said second members, and control means including pressure switches actuatable to and from open and closed positions in response to changes in pressure to and from said relatively high and said relatively low values to effect the actuation of said first and said second members from one operative position to another.

3. In an apparatus for moving a member to an operative position and changing a control circuit at said position, the combination of a movable member, a hydraulic actuator connected to said member and operable at a fluid pressure of a relatively low value for moving said member back and forth, a stop engageable with said member for arresting the movement of said member in one direction to stop said member in an operative position, means for adjusting said stop for varying the location of said operative position, means for selectively directing hydraulic fluid to opposite ends of said actuator under pressure of a relatively high value, a flow control valve in said last means for restricting the flow of the hydraulic fluid into one of the ends of said actuator to cause the actuation thereof in one direction at a pressure of said relatively low value and to cause the pressure therein to rise to said predetermined relatively high value when the movement of said member is stopped, and pressure responsive means connected to said one of the ends of the actuator and operable in response to an increase in hydraulic pressure from a lower value to said relatively high value for changing said control circuit.

4. In an apparatus for moving a member to predetermined positions and actuating a control circuit at said positions the combination of a movable member, a hydraulic actuator including a cylinder and piston operatively connected to said member and operable at fluid pressure of a relatively low value for moving said member back and forth, stop means for arresting the movement of said member in opposite directions to stop said member in predetermined positions, means for adjusting said stop means for varying said predetermined positions, means for selectively directing hydraulic fluid to opposite ends of said cylinder under pressure of a predetermined relatively high value, flow control valves in said last means for controlling the flow of the hydraulic fluid into the ends of said cylinder to control the velocity of said member and to effect a reduction in pressure to said relatively low value of the hydraulic fluid flowing into the cylinder while said fluid is flowing into the cylinder, said flow control valves permitting free flow of hydraulic fluid out of the cylinder and the equalizing of the pressure in the cylinder to said predetermined high value after the movement of the member has stopped, and pressure switches connected to the ends of the cylinder and operable to and from open and closed positions in response to variations in hydraulic pressure up to and below said relatively high value for actuating said control circuit.

5. In a drilling machine having a work supporting table vertically reciprocable relative to a drill for drilling a plurality of holes in a workpiece supported on said table and means including a control element for effecting the reciprocation of said table, the combination therewith of a first plate mounted on said table for movement thereon in one direction, a first hydraulic actuator for advancing and retracting said first plate from and to a loading position, stop means for limiting the advancing movement of said plate to stop said plate at a predetermined advanced position, a stop movable into the path of movement of said first plate to stop the return movement of said first plate at a predetermined position intermediate the advanced and the loading positions, a hydraulic actuator for moving the stop into and out of the path of movement of said first plate, a second plate mounted on said first plate for movement in a direction transversely of the movement of said first plate, a second hydraulic actuator for reciprocating said second plate, stop means for limiting the movement in opposite directions of said second plate to stop said second plate in predetermined positions, means on said second plate for holding said work thereon, means for supplying fluid to said actuators at a pressure of a relatively high value, valve means for effecting a reduction in the pressure of fluid to said first and said second hydraulic actuators to a relatively low value while the fluid is flowing into said actuators to actuate said actuators and to equalize the pressure of the fluid to said high value after the fluid ceases to flow into said actuators, pressure switches connected to opposite ends of said first and said second hydraulic actuators actuatable to and from open and closed positions in response to variations in fluid pressure in said first and said second actuators to and from said relatively high and said relatively low values, and control means including said pressure switches to effect the movement of said work holding means successively to said plurality of positions and the actuation of said control element to cause the reciprocation of said table in response to the arrival of said work holding means at said positions.

6. In an apparatus of the type described having a rotatable tool, a table for supporting work thereon, drive means for effecting the relative reciprocation of said table and said tool to cause the engagement of the tool with the work, and control means for said drive means including a control element actuatable to effect said relative reciprocation of said tool and said work, the combination therewith of a work holder, means on said table supporting said work holder for horizontal reciprocable movement in one direction and for horizontal reciprocable movement in another direction transversely of said one direction, a cylinder and piston to actuate said supporting means for reciprocating said work holder in said one direction, a cylinder and piston to actuate said supporting means for reciprocating said work holder in said other direction, stop means for arresting the movement of said means to stop said work holder in a plurality of predetermined positions, means for directing hydraulic fluid into opposite ends of said cylinders at a relatively low pressure while the hydraulic fluid flows into said cylinders to move said work holder into predetermined positions on said table and to cause the fluid pressure in said cylinders to rise to a relatively high pressure when said hydraulic fluid stops flowing into said cylinders, and control means including pressure switches responsive to the hydraulic pressure in said cylinders and operative to and from open and closed positions in response to variations in the hydraulic pressure between said high pressure and said low pressure for advancing said work holder sequentially to said predetermined positions and to actuate said control element to initiate a cycle of relative reciprocation of said tool and said work at said predetermined positions.

7. In a machine having a movable tool and mechanism for effecting the relative movement of the tool and a work piece into and out of engagement with each other in a plurality of positions in response to the actuation of a control element of said mechanism, the combination therewith of a work holder, means mounting said work holder for reciprocable movement in a first direction and in a second direction transversely of said first direction, a pair of hydraulic actuators each comprising a cylinder and pistons for reciprocating said work holder in said first and said second directions, stop means for arresting the movement of said holder to stop said work holder in a plurality of predetermined positions, means for adjusting said stop means to vary the predetermined positions of said work holders, means for supplying hydraulic fluid selectively to opposite ends of said cylinders at a pressure of a predetermined relatively high value, valve means for effecting a reduction in the pressure of the fluid flowing into the cylinders to a relatively low value while the fluid is flowing into said cylinder, said valve means serving to equalize the pressure of the hydraulic fluid on opposite sides thereof and in the cylinder associated therewith to said relatively high value in response to the stopping of the movement of said holder, pressure switches connected to opposite ends of said cylinders and operable to and from open and closed positions in response to variations between said relatively high and said relatively low values of the hydraulic fluid in said cylinders, and electrical control means including said pressure switches actuated in response to the movement of said work holder to said predetermined positions for actuating said control element to effect the relative movement of said tool and said work into and out of engagement with each other and for effecting the movement of said work holder successively to said predetermined positions.

8. In an article working machine having a rotatable tool, a vertically movable table, and means for reciprocating said table to engage said article with said tool, the combination therewith of means for holding and guiding said article for horizontal movement in a plurality of directions on said table, a first hydraulic actuator for reciprocating said article holding means through a predetermined stroke in one direction to align said article relative to said tool in two positions longitudinally of said article, a second hydraulic actuator for reciprocating said article holding means through a predetermined stroke in a second direction transverse to said first direction to align said article relative to said tool in two positions laterally of said article, means for selectively supplying fluid at a pressure of a relatively high value to opposite ends of said hydraulic actuators, means for effecting a reduction in the pressure of the fluid flowing into said actuators to a relatively low value while it flows into said actuators to move said article holding means and said article thereon sequentially into four predetermined positions relative to said tool, pressure switches connected individually with the ends of said hydraulic actuators and actuatable in response to an increase in pressure in said fluid to said relatively high value, and control means including said pressure switches operable in response to the movement of said article holding means to said predetermined positions and the actuation of two of said pressure switches to effect the reciprocation of said table.

9. In an apparatus of the type described having a member movable to a predetermined station and a control circuit operable in response to the movement of said member to said station, the combination therewith of a hydraulic actuator connected thereto and operable at a fluid pressure of a relatively low value for moving said member to and from said station, means for stopping said member at said station, means for supplying hydraulic fluid under pressure of a relatively high value, means including conduits for selectively directing the hydraulic fluid to opposite ends of said actuator, flow control means in one of said conduits for controlling the flow of the fluid into one end of said actuator to control the velocity of said member to said station and to effect a reduction in pressure of the hydraulic fluid flowing into the actuator to said relatively low value while said fluid is flowing into the actuator, said fluid control means permitting free flow of hydraulic fluid out of the cylinder in a reverse direction and the equalizing of the pressure in said one end of the actuator to said relatively high value after the flow of fluid into said actuator has stopped, and a pressure responsive switch electrically connected to said control circuit and hydraulically connected to said end of the actuator and operable to and from open and closed positions in response to variation in fluid pressure to and from said relatively high and said relatively low values for actuating said control circuit.

10. In an apparatus of the type described having a member movable to and from a pair of stations and a control circuit operable in response to the movement of said member to said stations, the combination with said movable member and said control circuit of a hydraulic actuator comprising a cylinder and piston operable at a fluid pressure of a relatively low value for reciprocating said member to and from said stations, means for stopping the member at said stations, means for supplying hydraulic fluid under a pressure of a relatively high value, means including conduits for selectively directing the hydraulic fluid to opposite ends of said cylinder, a flow control valve in each of said conduits for controlling the flow of the fluid into the ends of said cylinder to control the velocity of said member and to effect a reduction in pressure of the hydraulic fluid flowing into the cylinder to said relatively low value while said fluid is flowing into the cylinder, said fluid control valves permitting free flow of hydraulic fluid out of the cylinder in a reverse direction and the equalizing of the pressure of the fluid in the cylinder to said relatively high value after the flow of fluid into the cylinder has stopped, and pressure responsive switches electrically connected to said control circuit and hydraulically connected to said end of said cylinder and operable to and from open and closed positions in response to variation in fluid pressure to and from said relatively high and said relatively low values for actuating said control circuit.

11. In an apparatus of the type described, the combination of a first member reciprocable in one direction, a first hydraulic actuator operable at a fluid pressure of a relatively low value for reciprocating said first member, a second member mounted for reciprocation in a second direction transversely of said first direction, a second hydraulic actuator operable at a fluid pressure of a relatively low value for reciprocating said second member, means for limiting the movement of said first and said second members in opposite directions to stop said members at predetermined positions, means for supplying hydraulic fluid under a pressure of a relatively high value, conduit means interconnecting said last means and the opposite ends of said hydraulic actuators, electrically controlled valve means associated with said conduit operable to direct said fluid to opposite ends of said hydraulic actuators, flow control valves in said conduits for controlling the flow of the fluid into the ends of said hydraulic actuators to control the velocity of said first and said second members and to effect a reduction in pressure of the hydraulic fluid flowing into said actuators to said relatively low value while said fluid is flowing into said actuators, said fluid control valves permitting a free flow of hydraulic fluid of said hydraulic actuator in a reverse direction and the equalizing of the pressure of the fluid in the actuators to said relatively high value in response to the stopping of said members at said predetermined positions, pressure responsive switches hydraulically connected with the ends of said actuators and operable to and from open and closed positions in response to variation in fluid pressure to and from said relatively high and said relatively low values, and control means interconnecting said pressure response switches and said electrically actuated valves for effecting the actuation of said first and said second members to and from said predetermined positions in a predetermined sequence.

12. In an apparatus of the type described, a unitary work holder comprising a one-piece U-shaped member having an intermediate portion and a pair of arms extending therefrom in spaced relation to each other, an element removably secured to one of said arms forming a stationary jaw having a pair of work engaging surfaces disposed transversely to each other, means for removably securing said member to said apparatus, a cylinder fixed to said other arm with the axis of the cylinder in alignment with said stationary jaw, a movable jaw, a bracket removably secured to said base between said arms for supporting said movable jaw for movement along the axis of said cylinder toward and away from said stationary jaw, said movable jaw having a pair of work engaging surfaces disposed transversely to each other and cooperable with the work engaging surfaces of said stationary jaw for supporting a work piece on one of said surfaces on each of said jaws and for clamping the work piece between the other of said surfaces, a piston mounted in said cylinder and having a portion thereof engageable with said movable jaw, a fluid connection to one end of said cylinder for actuating said piston to effect the movement of said movable jaw in one direction to clamp said work, spring means on said bracket stressing said movable jaw for movement away from said stationary jaw to an open position, and means for limiting the movement of said movable jaw to said open position, the movement of said movable jaw to open position serving to return the piston a corresponding distance when the fluid pressure is removed from said one end of the cylinder.

13. In an apparatus of the type described, a unitary work holder comprising a one-piece U-shaped member having an intermediate portion and a pair of arms extending therefrom in spaced relation to each other, an element secured to one of said arms forming a stationary jaw having a pair of work engaging surfaces disposed transversely to each other, means for removably securing said member to said apparatus, a cylinder fixed to said other arm with the axis of the cylinder in alignment with said stationary jaw, a movable jaw, means on said base for supporting said movable jaw for movement between said arms along the axis of said cylinder toward and away from said stationary jaw, said movable jaw having a pair of work engaging surfaces disposed transversely to each other and cooperable with the work engaging surfaces of said stationary jaw for supporting a work piece on one of said surfaces on each of said jaws and for clamping the work piece between the other of said surfaces, a piston mounted in said cylinder and having a piston rod extending therefrom and engageable with said movable jaw, a fluid connection to one end of said cylinder for actuating said piston to effect the movement of said movable jaw in one direction to clamp said work, spring means stressing said movable jaw for movement away from said stationary jaw to an open position, and means for limiting the movement of said movable jaw to said open position, the movement of said movable jaw to open position serving to return the piston a corresponding distance when the fluid pressure is removed from said one end of the cylinder.

14. A unitary work holder comprising a one-piece, U-shaped member having an intermediate portion and a pair of arms extending from said portion in spaced relation to each other, one of said arms forming a stationary jaw having a work engaging surface, a cylinder fixed to said other arm with the axis of the cylinder in alignment with said stationary jaw, a movable jaw, means on said base for supporting said movable jaw for movement between said arms along the axis of said cylinder toward and away from said stationary jaw, said movable jaw having a work engaging surface opposed to and cooperable with the work engaging surface of said stationary jaw for clamping a work piece therebetween, a piston mounted in said cylinder and having a portion thereof engageable with said movable jaw, a fluid connection to one end of said cylinder for actuating said piston to effect the movement of said movable jaw in one direction to clamp said work, spring means stressing said movable jaw for movement away from said stationary jaw to an open position, and means for limiting the movement of said movable jaw to said open position, the movement of said movable jaw to open position serving to return the piston a corresponding distance when the fluid pressure is removed from said one end of the cylinder.

RUSSELL V. HALVORSEN.
WILLIAM F. KRAUSE.
RUDOLPH J. POLIVKA.

References Cited in the file of this patent

UNITED STATES PATENTS

| Number | Name | Date |
|---|---|---|
| 1,046,394 | Kolassa | Dec. 3, 1912 |
| 1,911,303 | Brown | May 30, 1933 |
| 2,472,968 | Goldberg | June 14, 1949 |
| 2,473,507 | Bullard | June 21, 1949 |